Dec. 9, 1958 J. R. ANDERSON 2,864,079
PULSE SIGNALING CIRCUIT
Filed June 10, 1957
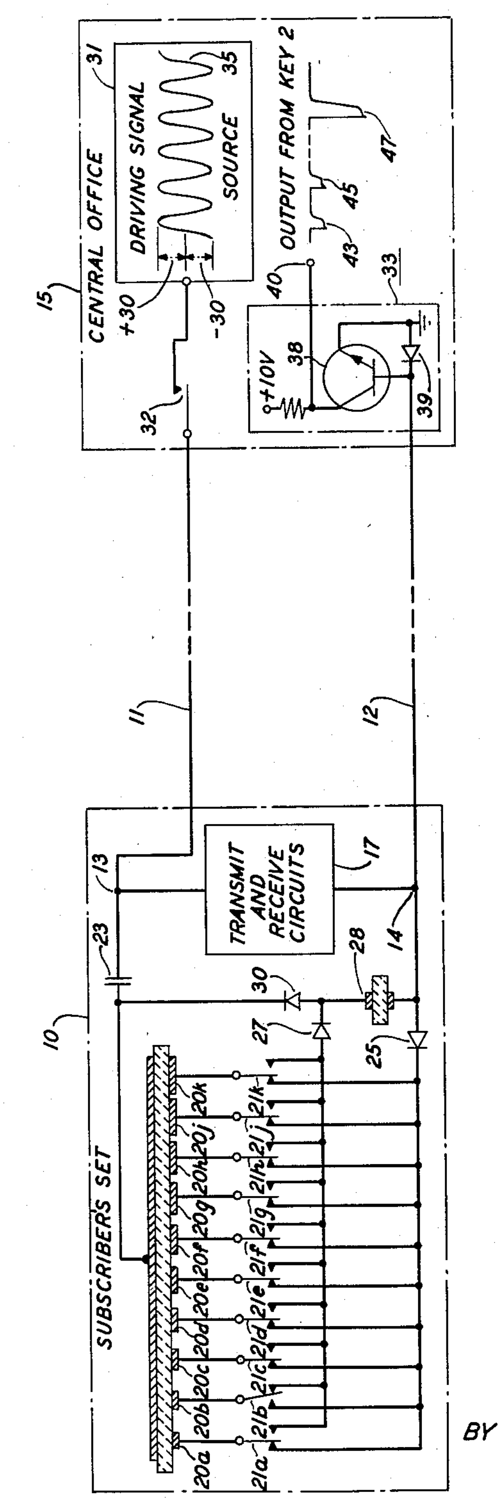
INVENTOR
J. R. ANDERSON
BY [signature]
ATTORNEY United States Patent Office 2,864,079

Patented Dec. 9, 1958

2,864,079

PULSE SIGNALING CIRCUIT

John R. Anderson, Kettering, Ohio, assignor to Bell Telephone Laboratories, Incorporated, New York, N. Y., a corporation of New York Application June 10, 1957, Serial No. 664,600

20 Claims. (Cl. 340—359)

This invention relates to electrical signaling circuits and more particularly to signaling circuits for transmitting digital pulses.

One type of digital signaling circuit priorly known is the revertive signaling circuit wherein a train of pulses are transmitted from one location to the signaling circuit which returns back to the original location a signal, which together with the transmitted pulses, is indicative of the digit being transmitted. Such circuits have been suggested for employment in telephone systems and specifically with reference to so-called push-button dialing arrangements wherein a signal is transmitted to a central office in response to the setting of one key or button in a telephone subset, indicative of a particular digit.

Accordingly, prior revertive signaling circuits have transmitted a group of pulses to certain telephone equipment, and after the equipment received a predetermined number of pulses, the equipment transmitted a single "stop" or control pulse to the signaling source. This particular system of revertive signaling requires extensive circuitry and is employed primarily within a central office or between two central offices.

Circuits for telephone subscriber push-button key sets in accordance with the prior art have employed extensive circuitry including numerous electron tubes and relays. These circuits have employed the concept of generating within the subset electrical signals indicative of the number of the called party and transmitting these signals to the central office. These circuits exhibit numerous disadvantages. These disadvantages include a large volumetric displacement and the requirement for extensive maintenance as well as the requirement for local power supply.

Accordingly, it is a general object of this invention to provide an improved signaling system.

It is another object of this invention to provide an improved revertive signaling system for selectively transmitting predetermined numbers of pulses.

It is another object of this invention to provide an improved push-button subscriber set for employment in communication and specifically in telephone systems.

In accordance with one aspect of this invention the revertive signaling circuit utilizes ferroelectric capacitors and specifically the properties of ferroelectric capacitors when connected in series and when the series connected capacitors are of unequal size.

As is known, ferroelectric capacitors exhibit rectangular hysteresis loops when applied electric field is plotted against polarization. These ferroelectric capacitors can be polarized in one polarity by the application of a pulse of a predetermined polarity to the electrodes, and this remanent polarization may be reversed by the application of a pulse of the opposite polarity to the electrodes. The principles of ferroelectric remanent polarization and reversal by means of applied pulses are explained in detail in my Patent 2,717,373, issued September 6, 1955.

Pairs of ferroelectric capacitors may be serially connected across a pulse source. The remanent polarization of both capacitors will be completely reversed, in response to a pulse of proper polarity and magnitude, if both capacitors have electrode areas of substantially the same magnitude and are polarized in the same direction. However, if these capacitors are polarized in opposite directions, then neither of the capacitors can be switched in response to pulses of either polarity applied across the series circuit. The reversal of the polarization of pairs of serially connected ferroelectric capicators is explained in detail in my patent 2,695,396, issued November 23, 1954.

When two capacitors of different electrode areas are serially connected across a pulse source, the smaller of the two capacitors acts as a charge-metering capacitor. The number of reversals of the polarization of the smaller capacitor required completely to reverse the polarization of the larger capacitor is a function of the ratio of the electrode areas of the two capacitors. For example, if the area of the electrodes of the larger capacitor is twice as large as the electrode area of the smaller capacitor, two reversals of the smaller capacitor will be required completely to reverse the polarization of the larger capacitor, assuming, of course, that an alternate path is provided to reset the smaller or charge-metering capacitor after each reversal of the smaller capacitor through the larger capacitor. The principles of operation of a serially connected pair of capacitors having different electrode areas are disclosed and described in detail in R. M. Wolfe application Serial No. 552,459, filed December 12, 1955.

Briefly, in accordance with aspects of this invention, a push-button subscriber's key set including ten ferroelectric capacitors having progressively larger electrode areas is connected through two conductors to the central office. An additional capacitor, called a charge-metering capacitor, is connected in the push-button circuits, the push buttons being intermediate the ten graduated or digit-indicating capacitors and the charge-metering capacitor. The charge-metering capacitor has an electrode area equal to the electrode area of the smallest of the graduated digit-indicating capacitors. The graduated capacitors are normally maintained polarized in one direction and are polarized in the opposite direction when connected to the charge-metering capacitor through a push-button key contact in response to driving pulses delivered from the central office over one conductor of the subscriber's loop. A pulse-detecting circuit in the central office is connected to the side of the subscriber's loop remote from the source of driving pulses. When the subscriber handset is removed, in the absence of an incoming signal such as a ringing signal from the central office, the central office applies driving signals to the graduated capacitor which is connected by the push-button contacts across the line. The remanent polarization of the selected graduated capacitor is reversed through the charge-metering capacitor, and the number of reversals of the charge-metering capacitor required completely to reverse the polarization of the graduated capacitor is indicated by the number of pulses detected at the central office on the other side of the subscriber's loop remote from the source of driving pulses.

It is a feature of this invention that a signaling circuit include a plurality of ferroelectric capacitors connected to deliver a plurality of pulses indicative of a digit to be transmitted.

It is another feature of this invention to connect a plurality of ferroelectric capacitors in a signaling circuit, each of the capacitors having a progressively larger electrode area. Further in accordance with this feature, by selectively closing a path between these capacitors and a transmission path, a predetermined number of pulses are sent over that transmission path indicative of a digit to be transmitted.

It is a further feature of this invention to connect the ferroelectric capacitors having graduated electrode areas selectively to the transmission path through a charge-metering capacitor, advantageously also a ferroelectric capacitor, so that the output signal from the charge-metering capacitor delivers the digit-indicating signals to the transmission path.

It is a still further feature of this invention that these capacitors be included in a telephone subscriber's push-button key set and a source of driving pulses be applied from the central office, these driving pulses generating the digit signals to be transmitted back to the central office due to the action of the ferroelectric capacitors.

A complete understanding of this invention and of these and various other features thereof may be gained from consideration of the following detailed description and the accompanying drawing which depicts a schematic representation of one specific illustrative embodiment of my invention.

Referring to the drawing, subscriber set 10, indicated in block and schematic form, is connected by wires 11 and 12 to central office 15. The transmit and receive circuits of the subscriber subset are included in block 17 and may be in accordance with any of the transmitter and receiver circuits known in the art which are adapted for common battery operation.

The push-button circuitry of the subscriber subset includes ferroelectric capacitors 20*a* through 20*k*. The electrode areas of each of the capacitors subsequent to 20*a* are a multiple of the area of the electrode of capacitor 20*a*; for example, capacitor 20*b* has an electrode area twice the area of capacitor 20*a*, while capacitor 20*k* has an electrode area ten times the area of capacitor 20*a*. Each of capacitors 20*a* through 20*k* may have a common electrode, as herein depicted, or they may be individual ferroelectric capacitors. These ferroelectric capacitors are the digit-indicating ferroelectric capacitors and are isolated from one side of the subscriber's loop by capacitor 23 and from the other side of the subscriber's loop by diode 25. Push buttons 21*a* through 21*k* are connected selectively to connect the digit-indicating ferroelectric capacitors in series with diode 27 and charge-metering ferroelectric capacitor 28. Diode 30 is connected between charge-metering capacitor 28 and capacitor 23 to provide a resetting path for charge-metering ferroelectric capacitor 28, as will be subsequently explained.

A driving signal source 31 and a pulse-detecting circuit 33 are located in the central office remote from the subscriber's subset. Source 31 provides driving pulses to reverse the remanent polarization of the selected digit-indicating capacitors in the subscriber's subset, while pulse-detecting circuit 33 delivers an output signal having a number of distinct pulses equal to the number of reversals of the remanent polarization of the digit-indicating capacitor through charge-metering capacitor 28, as will be subsequently explained.

Assume for the purpose of explanation of the operation of the subscriber's subset that the subscriber wishes to place a call from subscriber set 10. The subscriber removes the handset, completing a circuit from the central office through the transmit and receive circuits in a manner well known in the art. In response to this removal of the handset, driving pulse source 31 may be actuated by some convenient means, such as contacts 32 of a relay energized on detection of the off-hook condition, to apply driving signal 35 to conductor 11. The pulses from driving signal source 31 may advantageously be in the form of a sine wave, and they may be between 10 and 2000 cycles; such signals may serve the dual function of reversing the state of polarization of the ferroelectric capacitors and delivery of audible dial tone to the receiver. In one specific exemplary embodiment wherein the electrodes of the smallest capacitor were 21 by 21 mils and the dielectric was of barium titanate and was 2 mils thick, the magnitude of the driving pulses 35 was 60 volts peak to peak and the frequency was 1000 cycles per second.

For the purposes of explaining the operation of ferroelectric capacitors let us assume that capacitors 20*a* through 20*k* and 28 are initially poled in a negative direction; that is, a negative voltage has just been applied to the upper electrode which is common to each of these capacitors. Diode 25 assures that this remanent polarization is not disturbed on the alternate half cycles of signal 35 when a positive pulse is applied to conductor 11. If one of the keys, for example key 21*b*, is operated to its right-hand position, as indicated in the drawing, capacitor 20*b* will be connected in series through diode 27 and capacitor 28 between conductors 11 and 12. Therefore, since capacitor 20*b* and capacitor 28 are connected in series across the line and are both poled in the same direction, they will switch in series in response to the first positive pulse of drive signal 35.

The remanent polarization of capacitor 28 is completely reversed in response to the first positive pulse. However, only half of the remanent polarization of capacitor 20*b* can be reversed in response to the first positive pulse because the electrode area of capacitor 20*b* is twice as large as the electrode area of capacitor 28 and the size of capacitor 28 determines the amount of change of polarization of capacitor 20*b*. On the succeeding negative pulse, capacitor 28 will be switched back to its original state through diode 30, but capacitor 20*b* cannot be affected by the negative pulse due to the polarity of diode 27. On the second succeeding positive cycle, the remaining domains or remanent polarization of capacitor 20*b* will be switched through capacitor 28. Each reversal of the remanent polarization of capacitor 28 in response to positive pulses delivered through the digit-indicating capacitors will cause positive pulses to be delivered over conductor 12 to pulse-detecting circuit 33 in the central office. These positive pulses will trigger transistor 38 in the pulse-detecting circuit to cause negative going pulses to be delivered at output terminal 40 of the pulse-detector circuit. Reversals of capacitor 28 in the negative direction will not affect transistor 38 due to the poling of diode 39 connected between the emitter and base of transistor 38.

The output terminal 40 can be connected to suitable registering and selecting circuitry for connecting the calling subscriber with the called subscriber in any convenient manner as is well known in the art. The first output pulses 43 and 45 from terminal 40 will represent the number of the key or push button 21 that has been depressed. The last output pulse 47 at terminal 40 will be N times as large as a unit pulse, N being the selected number. Pulse 47 represents the restting of th digit-indicating capacitor, which resetting is accomplished through diode 25 when the selected push button 21 is returned to its normal or left-hand position and a negative pulse is applied from driving signal source 31.

While the capacitors 20*a* through 20*k* have been shown as individual capacitors, it is obvious that, by proper contact circuitry, various of the larger capacitors could be defined by parallel combinations of the smaller capacitors, if desired.

It is to be understood that the above-described arrangements are illustrative of the application of the principles of the invention. Numerous other arrangements may be devised by those skilled in the art without departing from the spirit and scope of the invention.

What is claimed is:

1. A signaling circuit for selectively delivering digit-indicating pulses comprising a first and a second terminal, a plurality of ferroelectric capacitors having graduated electrode areas and connected in parallel between said terminals, a charge-metering ferroelectric capacitor connected to one of said terminals, and means for selectively connecting said digit-indicating capacitors to said charge-metering capacitor.

2. A signaling circuit including a first and a second line terminal, a plurality of digit-indicating ferroelectric capacitors each having different electrode areas, switch means for normally connecting each of said capacitors between said first and said second terminals, a charge-metering ferroelectric capacitor, said switch means including means for selectively connecting said plurality of capacitors to said charge-metering capacitor, and means including said charge-metering capacitor for controlling the switching of said digit-indicating capacitors in discrete steps.

3. A signaling circuit in accordance with claim 2 wherein one of said digit-indicating ferroelectric capacitors has a unit electrode area and wherein each of the remaining digit-indicating ferroelectric capacitors has an electrode area equal to a different multiple of the unit electrode area.

4. A signaling circuit in accordance with claim 2 wherein said charge-metering ferroelectric capacitor has an electrode area equal to the electrode area of the smallest of the digit-indicating ferroelectric capacitors.

5. A signaling circuit in accordance with claim 2 further including diode means connected between said switch means and said charge-metering ferroelectric capacitor.

6. A signaling circuit in accordance with claim 2 further including diode means between said switching means and said second line terminal.

7. A signaling circuit in accordance with claim 2 further including diode means connected between said charge-metering capacitor and said first subscriber line terminal.

8. A circuit for transmitting digital pulses including a first conducting path, means for applying a train of pulses to said conducting path, a second conducting path, a plurality of ferroelectric capacitors connected between said first and said second conducting paths selectively to control the transmission of pulses from said pulse train to said second conducting path, switch means associated with certain of said ferroelectric capacitors for selectively controlling the connections between said capacitors, and detecting means connected to said second conducting path for delivering an output signal indicative of the number of pulses transmitted through said second conducting path.

9. A circuit for transmitting digital pulses in accordance with claim 8 wherein certain of said ferroelectric capacitors are digit-indicating capacitors each having different electrode areas.

10. A circuit for transmitting digital pulses in accordance with claim 9 wherein one of said ferroelectric capacitors is a charge-metering capacitor, said charge-metering capacitor having an electrode area equal to the electrode area of the smallest of said digit-indicating ferroelectric capacitors.

11. A circuit for transmitting digital pulses in accordance with claim 10 further including first diode means connected in circuit with said digit-indicating ferroelectric capacitors for providing a resetting path for said digit-indicating ferroelectric capacitors.

12. A circuit for transmitting digital pulses in accordance with claim 11 further including second diode means connected in circuit with said charge-metering ferroelectric capacitor to provide a resetting path for said charge-metering ferroelectric capacitor.

13. A circuit for transmitting digital pulses in accordance with claim 12 further including third diode means connected between said digit-indicating ferroelectric capacitors and said charge-metering capacitor for permitting reversal of polarization of said digit-indicating ferroelectric capacitors through said charge-metering capacitor in response to pulses of only one polarity from said means for applying pulses to said first conducting path.

14. A communication circuit for transmitting digital pulses from a subscriber set to a central office, comprising a driving signal source in said central office, a subscriber set, a conducting path connecting said driving signal source to said subscriber set, a pulse-detecting circuit in said central office, and a second conducting path connecting said subscriber set to said pulse-detecting circuit, said subscriber set comprising a group of ferroelectric digit-indicating capacitors, a charge-metering ferroelectric capacitor, and switch means for selectively connecting said digit-indicating ferroelectric capacitors to said charge-metering ferroelectric capacitor.

15. A communication circuit for transmitting digital pulses in accordance with claim 14 wherein said subscriber set further comprises diode means connected in circuit with said digit-indicating ferroelectric capacitors to provide a resetting path for said digit-indicating ferroelectric capacitors.

16. A communication circuit for transmitting digital pulses in accordance with claim 15 wherein said subscriber set further includes diode means connected in circuit with said charge-metering ferroelectric capacitor to provide a resetting path for said charge-metering ferroelectric capacitor.

17. A communication circuit for transmitting digital pulses in accordance with claim 16 wherein said subscriber set further includes diode means connected between said switch means and said charge-metering ferroelectric capacitor to permit the reversal of the remanent polarization of said digit-indicating ferroelectric capacitors through said charge-metering capacitor in response to pulses of only one polarity.

18. A circuit for selectively transmitting digital pulses comprising a source of pulses of alternate polarity, a pulse-detecting means, and means connected between said pulse and said pulse-detecting means for selectively transmitting a predetermined number of said pulses to said detecting means, said last-mentioned means including ferroelectric means and switch means for selectively controlling the connections of said ferroelectric means.

19. A signaling circuit for selectively delivering digit-indicating pulses comprising a first and a second terminal, a plurality of ferroelectric capacitors having graduated electrode areas and connected in parallel between said terminals, a distinct ferroelectric capacitor connected to one of said terminals, and means for selectively connecting any of said plurality of ferroelectric capacitors in series with said distinct capacitor.

20. A signaling circuit for selectively delivering digit-indicating pulses comprising a first and a second terminal, a plurality of ferroelectric capacitors having graduated electrode areas and connected in parallel between said terminals, means for applying a train of pulses to said first terminal, and means responsive to said pulse train for delivering a number of pulses to said second terminal, said last-mentioned means including a ferroelectric capacitor connected to said second terminal and means for selectively connecting said plurality of capacitors to said last-mentioned ferroelectric capacitor.

References Cited in the file of this patent

UNITED STATES PATENTS 2,463,708 McReary ---------------- Mar. 8, 1949